United States Patent [19]

Koinuma et al.

[11] Patent Number: 4,546,843
[45] Date of Patent: Oct. 15, 1985

[54] COOLING SYSTEM

[75] Inventors: Yutaka Koinuma; Yasuo Ikenoya, both of Saitama; Akira Hayashi, Tokyo, all of Japan

[73] Assignee: Honda Giken Kogyo Kabushiki Kaisha, Tokyo, Japan

[21] Appl. No.: 528,365

[22] Filed: Aug. 31, 1983

[30] Foreign Application Priority Data

Sep. 20, 1982 [JP] Japan .................. 57-142471[U]

[51] Int. Cl.$^4$ ............................................. B60K 11/06
[52] U.S. Cl. .................................. 180/229; 55/385 B
[58] Field of Search ............. 180/229, 225, 219, 68.1; 55/385 B, DIG. 28

[56] References Cited

U.S. PATENT DOCUMENTS

| 2,225,914 | 12/1940 | Lewis et al. | 180/219 |
|---|---|---|---|
| 3,618,691 | 11/1971 | Honda | 180/68.2 |
| 3,773,127 | 11/1973 | Aaen et al. | 180/68.1 X |
| 3,791,482 | 2/1974 | Sykora | 180/68.1 X |
| 4,093,119 | 6/1978 | Swisher | 237/68.2 X |
| 4,164,262 | 8/1979 | Skatsche et al. | 180/68.1 |
| 4,340,123 | 7/1982 | Fujikawa | 180/68.1 |

FOREIGN PATENT DOCUMENTS

| 1107539 | 5/1961 | Fed. Rep. of Germany ..... 180/68.1 |
| 800042 | 8/1958 | United Kingdom . |
| 2049583 | 4/1983 | United Kingdom . |

OTHER PUBLICATIONS

Honda Lead Shop Manual, Cover, pp. 122, 124, 126, 127, 132, 148, 151, 248, 249, 256.

Primary Examiner—John A. Pekar
Attorney, Agent, or Firm—Lyon & Lyon

[57] ABSTRACT

A system for cooling the engine compartment and for providing clean air to the air cleaner of a motorized cycle having a body cover, including an engine fan, a fan cover extending between the fan and a head cover surrounding the cylinder head, and a vent hole in the shroud formed by the fan cover and the head cover directing the air flow induced by the fan, after it has been used to cool the cylinder head, into the engine compartment defined by the body cover and towards the air cleaner intake port.

3 Claims, 3 Drawing Figures

COOLING SYSTEM

BACKGROUND OF THE INVENTION

The field of the present invention is air flow through an engine compartment of a motorized cycle.

In order to make motorcycles lighter in weight and appealing to diverse groups, small models of motorized cycle designs have been developed. Generally, such vehicles include a small engine block coupled with an air cleaner and other components suspended on the body frame just in front of and surrounding the rear wheel. Such motorized cycles, often referred to as motor scooters, may include a body cover which surrounds the engine to make the vehicle more attractive for a variety of reasons to many people who are not interested in a true motorcycle. However, such body covers may have a detrimental effect on cooling air flow, both to the engine and to other components. Also, during normal driving, the rear wheel raises dust by rotation even though it is covered by a rear fender. As a result, the air inside the body cover can become both hot and dirty. The air cleaner, whose intake port is generally located inside the body cover, sucks in the hot, dirty air, burdening the air cleaner and necessitating frequent filter changes.

SUMMARY OF THE INVENTION

The present invention is directed to a system for providing cool, relatively clean air to the air cleaner on a small vehicle such as a motorized cycle. A portion of the forced cooling air from an engine fan is directed into the surrounding engine compartment and towards the intake port of the air cleaner.

The diversion of a portion of the cooling air from the engine into the engine compartment prevents stagnation of the air in the compartment. Thus, components and heat sensitive materials may be maintained at a cooler temperature. In addition, relatively clean air can be sent to the intake port of the air cleaner, improving the environment of the engine, simplifying maintenance by reducing the need for air filter replacement, and giving the engine increased life. Furthermore, such a system avoids the need for additional vents which might otherwise detract from the appearance of the vehicle, might reduce the effectiveness of the body cover for noise reduction, and might increase the amount of heat conducted to the rider, particularly underidling conditions. At the same time, only one fan and forced air system need be provided.

Accordingly, it is an object of the present invention to provide a cooling system with a directed air stream for a motorized cycle employing a body cover surrounding an engine. Other and further objects and advantages will appear hereinafter.

DETAILED DESCRIPTION OF THE PREFERRED EMBODIMENT

Figure 1:
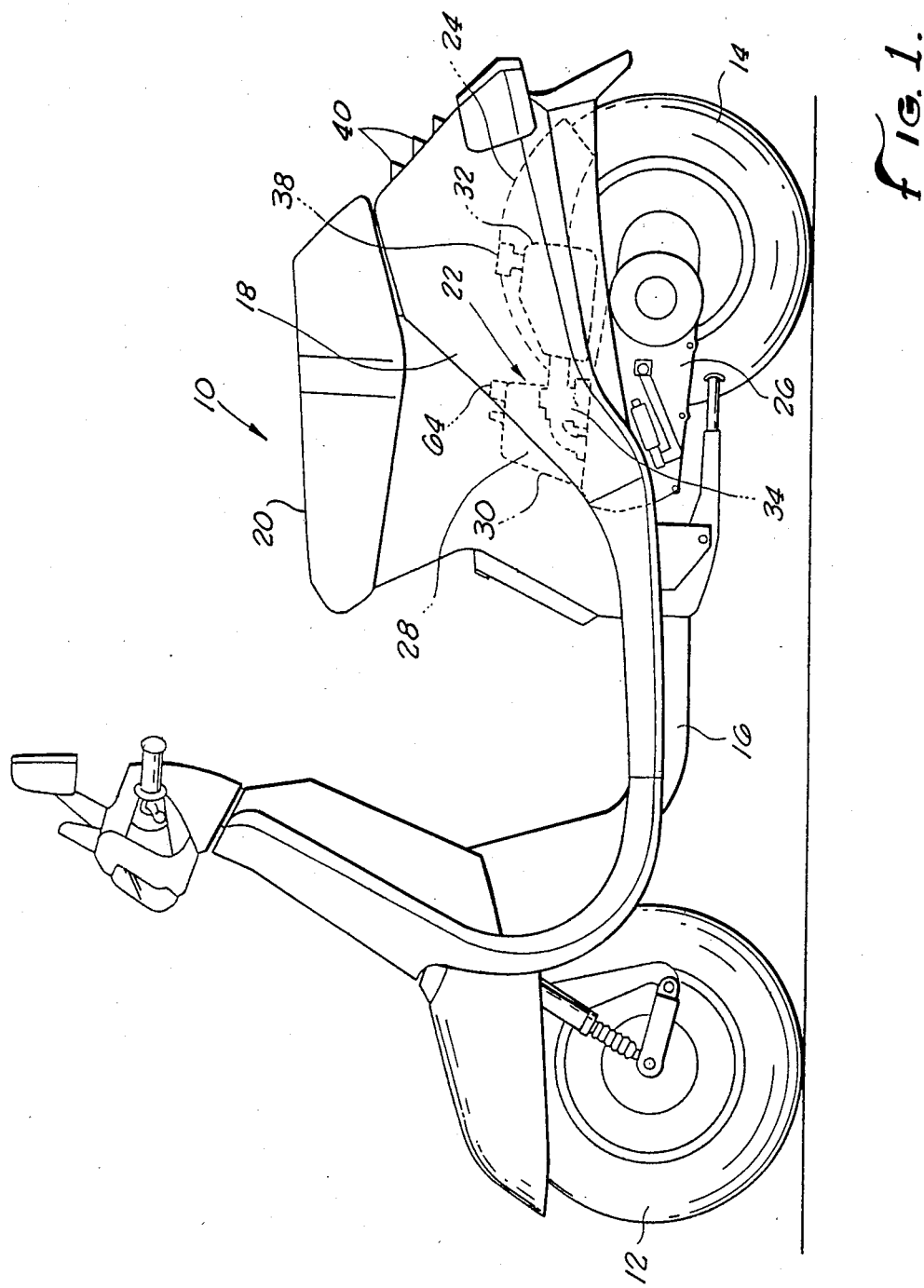
FIG. 1 is a side view of a vehicle associated with the device of the present invention.
Figure 2:
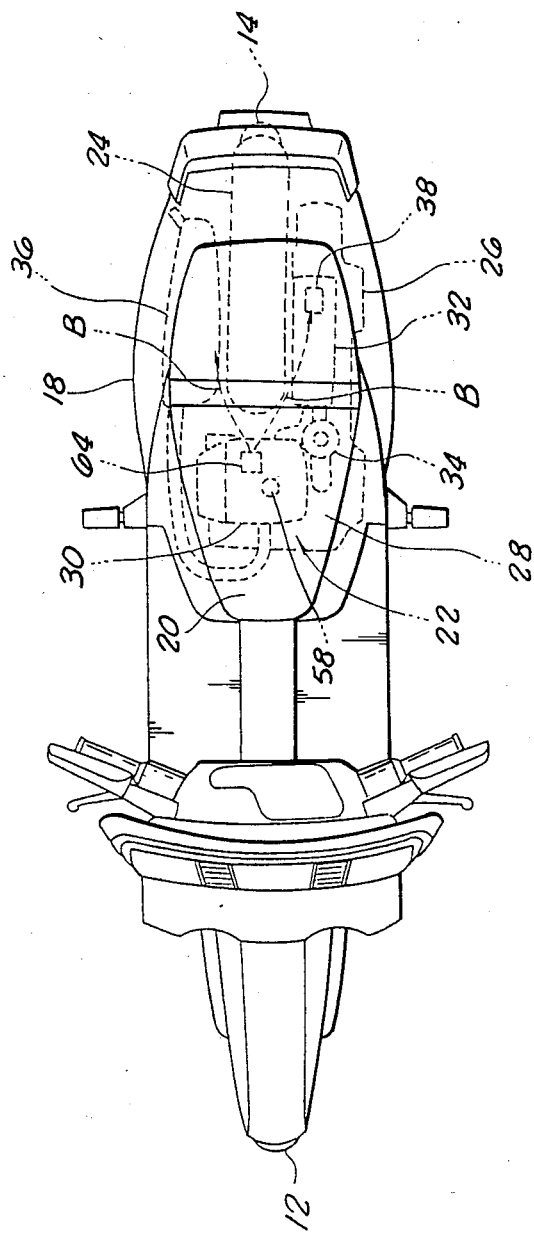
FIG. 2 is a top view of the vehicle of FIG. 1.

Turning in detail to the drawings, a motor scooter 10 is illustrated. The motor scooter 10 may be any one of a number of small vehicles employing a body cover surrounding an engine to which the present invention is applicable. However, such small motorized cycles are frequently found to include such body coverings. The motor scooter 10 includes wheels 12 and 14, a body 16, a body cover 18 about the rear portion of the motor scooter 10, and a seat 20.

Located within the body cover 18 is a power unit 22, which is swingably mounted to the frame of the cycle with a rear wheel 14, a rear fender 24, and a power transmission system 26. The power unit includes an air cooled engine 28 equipped with a head cover 30 provided so as to surround its cylinder portion, a fuel mixture supply system comprising an air cleaner 32 and a carburetor 34 located on the left side of the rear fender 24, and an exhaust muffler 36 extended from a suitable location on the cylinder and bent to extend rearward on the lower right side of the rear body. An intake port 38 is positioned atop the air cleaner 32.

The body cover 18 includes a vent 40 for allowing the advantageous exhausting of the engine compartment. The vent 40 is displaced from the seat 10 so that hot air and fumes will not reach the operator. Also, the vent is positioned at the back of the vehicle to enhance forced exhaust when the vehicle is moving. The underside of the body cover 18 is also open for venting.

The engine 28 is typically air cooled, and includes a cylinder head 42 and a crankshaft extension 44 for driving auxiliary equipment such as an AC generator 46.

Associated with the crankshaft extension 44 outwardly of the AC generator 46 is a fan 48. The fan 48 is positioned relative to the body cover 18 such that it may receive cool air from outside from beneath the body cover 18 or through a louvered opening 50 in the body cover 18. The fan is held on by conventional means and is operative when the engine is on, the fan running at the engine speed.

Figure 3:
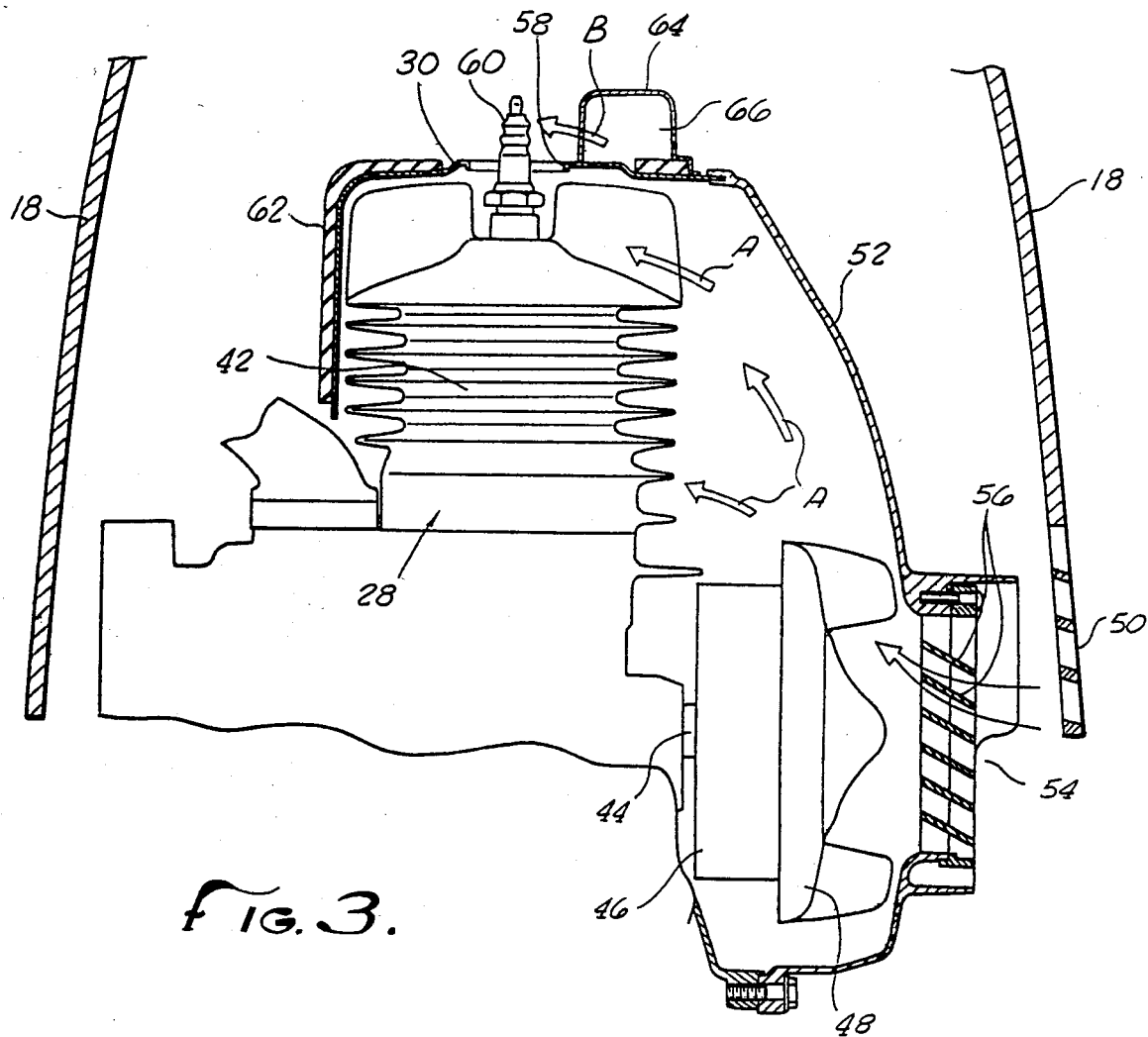
FIG. 3 is a cross-sectional elevation illustrating in greater detail an engine employing the present invention.

Surrounding the fan 48 is a fan cover 52. The fan cover 52 has an inlet 54 with louvers 56 facing towards the side of the motor scooter 10. The placement of the inlet 54 and the louvers 56 help prevent water, mud, and the like from entering into the cooling system. The cover 52 extends about the fan 48 for collection of the air flow from the fan 48 for distribution upwardly and towards the cylinder head 42. The cover 52 is curved towards the head 42 and opens right adjacent the head for direct cooling. Arrows A in FIG. 3 depict the flow both into the fan and upwardly towards the head 42.

A head cover 30 surrounds the cylinder head 42 opposite the fan cover opening. Together, the head cover 30 and the fan cover 52 form a shroud which effectively covers the fan 48 and the cylinder head 42, and forms a directed channel between the two. The head cover 30 has a hole 58 at the top of the cylinder head 42 through which a spark plug 60 is installed into the cylinder head 42. A rubber piece 62 for insulating vibration is installed on the side of the head cover 30.

A vent hole 64 is formed at the upper end of the head cover 30, next to the hole 58. The vent hole 64 has an opening 66 facing to the rear of the body cover 18. During operation of the engine, the fan 48 rotates to take in fresh air through the opening 50 and the fan inlet 54. The fresh air is guided by the shroud formed by the fan cover 52 and the head cover 30 to the cylinder head 42 as cooling air. Some of the air (arrow A) which has cooled the cylinder head 42 is sent out through the vent hole 64 to the rear of the body cover 18. The discharged air (arrow B) strikes against the rear fender 24 and flows along both sides of the rear fender 24 within the body cover 18, part of the discharged air being discharged from the lower rear end of the body cover 18 and the rest being discharged through the rear vent 40.

The flow of discharged air thus created supplies relatively clean air from the vent hole 64 to the air cleaner intake port 38, minimizing the amount of dust and other fouling particles flowing into the air cleaner 32. The air discharged out through the vent hole 64 is also utilized as a constant flow of cooling air to cool other components within the body cover 18. The air dissipates heat, cooling system members formed mainly with synthetic resins which may be subject to heat damage.

Thus, a cooling system is disclosed for overcoming the difficulties associated with a body cover surrounding an engine on a motorized cycle. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A cooling system for an engine compartment of a motorized cycle having a body cover and an air cooled engine with a cylinder head within the body cover, and an air cleaner having an intake port thereto, comprising
   a fan mounted on the engine and driven thereby;
   a shroud mounted on the engine provided so as to surround the cylinder head and said fan; and
   a vent hole formed at the upper end of said shroud having an opening facing the intake port of the air cleaner.

2. The cooling system of claim 1 wherein the air cleaner intake port is located at the same elevation as said vent hole opening.

3. A motorized cycle, comprising
   a body;
   a body cover;
   an air cooled engine mounted within said body cover and having a cylinder head, an air cleaner intake port, and a crankshaft extension;
   a fan fixed to said crankshaft extension for rotation therewith;
   a shroud fixed to said engine surrounding said cylinder head and said shroud having a hole at the top of the cylinder head; and
   a vent hole formed at the top of said shroud beside said shroud hole, said vent hole opening towards said air cleaner intake port.

* * * * *